United States Patent
Lamont

[11] Patent Number: 6,126,385
[45] Date of Patent: Oct. 3, 2000

[54] WIND TURBINE

[76] Inventor: John S. Lamont, 218 Tweedsmuir Road, Winnipeg, Manitoba, Canada, R3P 1Z5

[21] Appl. No.: 09/189,688

[22] Filed: Nov. 10, 1998

[51] Int. Cl.[7] ................................ F03D 7/04
[52] U.S. Cl. .................. 415/4.5; 415/4.3; 415/159; 415/199.4; 415/214.1; 415/905; 290/55
[58] Field of Search ............... 415/2.1, 4.1, 4.3, 415/4.5, 66, 149.2, 155, 161, 198.1, 199.4, 205, 206, 214.1, 159, 905, 908; 290/55, 44

[56] References Cited

U.S. PATENT DOCUMENTS

| | | | |
|---|---|---|---|
| 1,345,022 | 6/1920 | Oliver | 415/4.3 |
| 4,132,499 | 1/1979 | Igra . | |
| 4,134,707 | 1/1979 | Ewers . | |
| 4,178,124 | 12/1979 | Puskas . | |
| 4,242,050 | 12/1980 | Oakes | 290/55 |
| 4,266,403 | 5/1981 | Hirbod . | |
| 4,309,146 | 1/1982 | Hein et al. . | |
| 4,324,985 | 4/1982 | Oman | 290/55 |
| 4,498,017 | 2/1985 | Parkins . | |
| 4,545,729 | 10/1985 | Storm . | |
| 4,619,585 | 10/1986 | Storm . | |
| 5,332,354 | 7/1994 | Lamont . | |
| 5,447,412 | 9/1995 | Lamont . | |
| 5,463,257 | 10/1995 | Yea . | |
| 5,472,311 | 12/1995 | Davis . | |
| 5,553,996 | 9/1996 | Farrar . | |

*Primary Examiner*—Edward K. Look
*Assistant Examiner*—Liam McDowell
*Attorney, Agent, or Firm*—Dorsey & Whitney LLP

[57] ABSTRACT

A wind turbine for generating power comprising one or more blades mounted to a shaft for rotational movement in response to an airflow, a housing having a generally central longitudinal axis, the housing surrounding the one or more blades and the shaft, wherein the housing includes an inlet opening and an outlet opening, and an adjustable scoop operably associated with the housing to alter the airflow entering the inlet opening.

12 Claims, 14 Drawing Sheets

WIND TURBINE

BACKGROUND OF THE INVENTION

1. Field of the Invention

This invention relates to wind driven turbines. More particularly, this invention relates to a turbine designed to capture a maximum amount of energy from wind to drive an electrical generator.

2. Background Information

Wind driven turbines and windmills have been used for centuries to capture energy and generate power. There have been constant efforts to increase the efficiency and hence the energy production of wind turbines. The goal of many wind turbine designs has been to obtain power in greater or lessor quantities without making the apparatus cumbersome, expensive or overly complex.

Some turbines have been developed that use fan blade wheels to drive a shaft to produce energy, while other turbines use rotors connected to a shaft. For example, wind driven generators consisting of rotors having a plurality of parallel vanes arranged circumferentially around a vertical axis have been used to drive generators. Housings have been developed to surround the rotors to capture the wind and direct the airflow to increase the efficient use of the energy of the captured wind to push the rotors. See U.S. Pat. No. 5,332,354, issued to Lamont on Jul. 26, 1994, and U.S. Pat. No. 5,447,412, issued to Lamont on Sep. 5, 1995. The Lamont patents show a unique wind turbine design containing a housing enclosing a turbine means and a baffle to direct the wind to drive the blades of the turbine in varying locations. These designs advantageously capture the atmospheric power source to drive the blades of the turbine in more than one location. Other turbine designs have been developed with housings rotatably mounted on support structures with vanes that direct the housing, and hence the blades, to the direction of the oncoming wind.

A variety of wind turbines have also been designed with converging inlet passages that increase the velocity of the wind, and hence decrease the pressure in the passage, as the inlet passage narrows. See U.S. Pat. No. 4,132,499, issued to Igra on Jan. 2, 1979, and U.S. Pat. No. 4,178,124, issued to Puskas on Dec. 11, 1979. The Igra and Puskas patents show a converging conical inlet used to capture wind for the wind turbines that increase the velocity of the wind as it moves toward the turbines.

The prior art wind turbines have a number of disadvantages. One disadvantage is that a number of wind turbine designs that use a housing to enclose the turbine blades do not capture a maximum amount of energy from the airflow. Another disadvantage of a number of prior art devices is that they lack simplicity. Complex turbine designs or turbines with a large number of parts are likely not only to be more expensive, but also more prone to failure. Another disadvantage of a number of the prior art wind turbines is that they are not easily adjustable for use in differing wind conditions. If a turbine designed for use in low wind velocities is subjected to high winds, therefore, it may be prone to failure or damage. Similarly, if a turbine designed for use in high wind velocities is subjected to low velocities, it will produce only small amounts of energy.

A need exists for a wind turbine that captures a maximum amount of the wind energy caught by a housing enclosing turbine blades, utilizes a simple design to contain the cost of the wind turbine and decrease the risk of failure, and adjusts readily so that it may be used in different geographic areas or in varying wind conditions without harm to the wind turbine.

SUMMARY

One embodiment of the invention is a wind turbine for generating power. The wind turbine comprises one or more blades mounted to a shaft for rotational movement in response to an airflow, a housing having a generally central longitudinal axis, wherein the housing surrounds the one or more blades and the shaft and wherein the housing includes an inlet opening and an outlet opening, and an adjustable scoop operably associated with the housing to alter the airflow entering the inlet opening.

Another embodiment of the invention is a wind turbine for generating power that comprises a cylindrical housing having a generally central longitudinal axis, with the housing having an inlet opening and an outlet opening, a series of fan blade wheels mounted to a generally horizontal shaft in the housing coaxial with the longitudinal axis for rotational movement in response to wind movements, wherein the series of fan blade wheels and the shaft are enclosed in the housing, and wherein the fan blade wheel nearest the inlet opening of the housing is a compression fan blade wheel that acts to draw air into the housing, and a generally vertical rod connected to the shaft by a transmission device, wherein the generally vertical rod may be connected to a generator to produce power.

An advantage of the wind turbine of the present invention is that it effectively utilizes a maximum amount of the energy of the wind captured by the housing. Further, it is a simple design for the wind turbine and the housing so that it is not overly complex and is not costly.

Another embodiment of the invention is a scoop attachable to a wind turbine enclosed by a housing. The scoop may comprise a plurality of flanges, wherein a first end of each flange is movably connected to a circular band having a generally longitudinal axis and each flange extends from the circular band to an outer end, wherein the plurality of flanges consists of inner flanges and outer flanges, and an actuating device to move each flange relative to the circular band, such that the radial position of the outer end of each flange relative to the longitudinal axis is adjustable, wherein the inner flanges may be adjusted to form a cone with a smaller inlet diameter than that of the circular band, and wherein the inner flanges and outer flanges may be adjusted to mate and form a scoop with a larger inlet diameter than that of the circular band.

Yet another embodiment of the invention is a scoop attachable to a wind turbine enclosed by a housing to regulate the airflow into the housing. In this embodiment, the scoop comprises a set of inner flanges connected at a first end to a support band and extending to an outer end, wherein the outer ends of the inner flanges may be joined together to form a smaller surface area opening to the scoop than a surface area opening at the support band, and a set of outer flanges that are connected at a first end to the support band and extend to an outer end, wherein the outer ends of the outer flanges and the outer ends of the inner flanges may be aligned together to form a larger surface area opening to the scoop than the surface area opening at the support band.

An advantage of the scoop of the present invention is that it is easily adjustable to regulate the airflow into a housing enclosing a wind turbine. Another advantage is that the scoop has a relatively simple and inexpensive design. Further, the scoop may be attached to a housing enclosing a wind turbine to protect the wind turbine in rough weather.

Other features and advantages of the wind turbine and scoop of the present invention will become more fully apparent and understood with reference to the following description and drawings, and the appended claims.

DETAILED DESCRIPTION

The accompanying Figures depict embodiments of the wind turbine of the present invention, and features and components thereof. With regard to means for fastening, mounting, attaching or connecting components of the present invention to form the invention as a whole, unless specifically described otherwise, such means are intended to encompass conventional fasteners such as machine screws, machine threads, seals, snap rings, clamps, rivets, nuts and bolts, toggles, pins and the like. Components may also be connected adhesively, by friction fitting, or by welding or deformation, if appropriate. Unless specifically otherwise disclosed or taught, materials for making components of the present invention are selected from appropriate materials such as metal, metallic alloys, natural or synthetic materials, plastics and the like, and appropriate manufacturing or production methods including casting, extruding, molding and machining may be used.

Any references to front and back, right and left, top and bottom, upper and lower, and horizontal and vertical are intended for convenience of description, not to limit the present invention or its components to any one positional or spacial orientation. All dimensions of the components in the attached Figures may vary with a potential design and the intended use of an embodiment of the invention without departing from the scope of the invention.

a. General Overview

Figure 1:
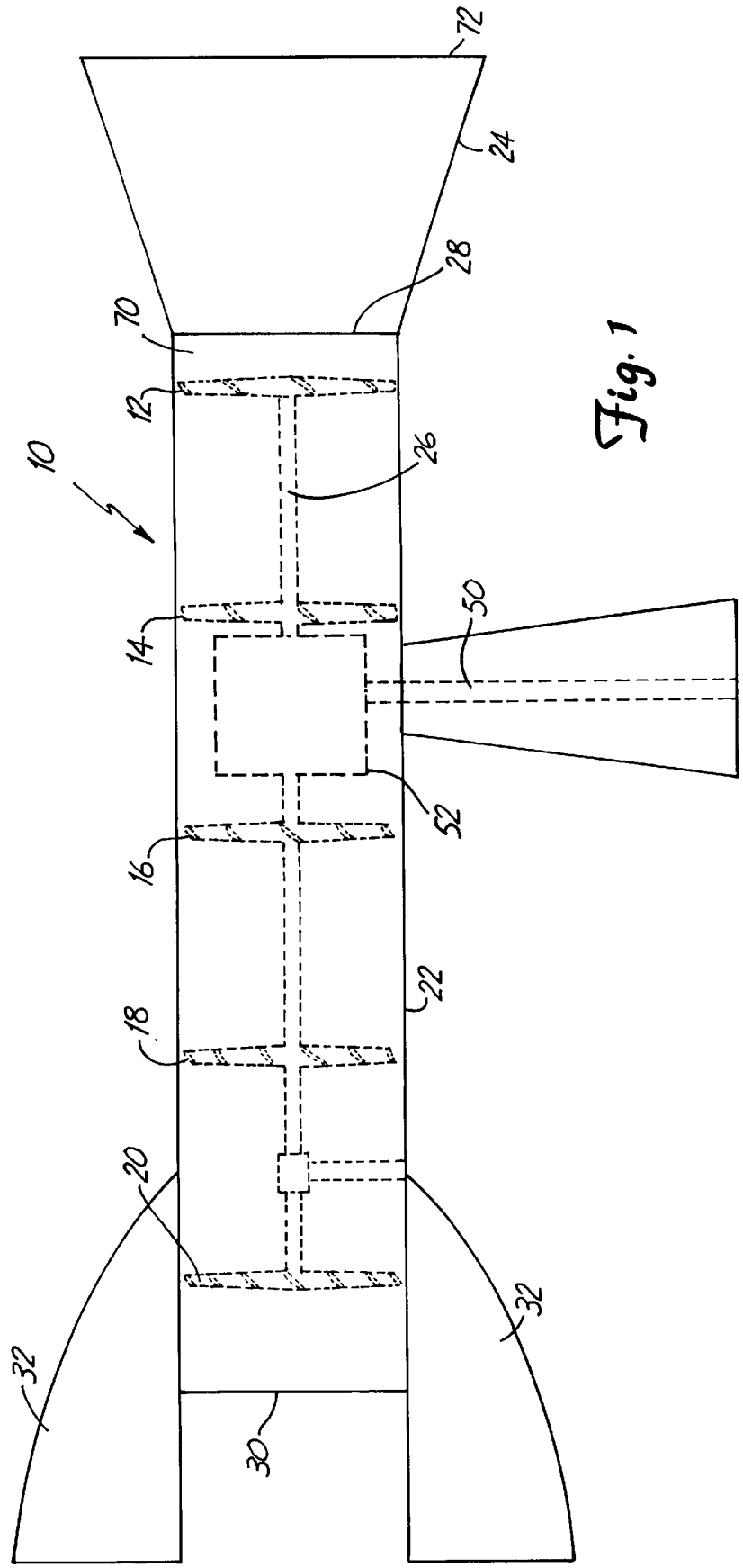
FIG. 1 is a side view of one embodiment of the wind turbine in its entirety.

A number of embodiments of the invention are shown in FIGS. 1–14. FIG. 1 shows the wind turbine 10 of the invention. The wind turbine 10 generally comprises a series of fan blade wheels 12, 14, 16, 18, 20 mounted to a shaft 26, a generally cylindrical housing 22 surrounding the fan blade wheels 12, 14, 16, 18, 20 and the shaft 26, and a scoop 24 connected to the housing 22. The housing 22 may be a circular tube or a cylinder, and it may be made from any variety of rigid material. The housing 22 has a generally central longitudinal axis and contains an inlet opening 28, from which air may enter the housing 22, and an outlet opening 30, from which air may exit the housing 22. The housing 22 may also contain one or more vanes 32 that may direct the orientation of the housing 22, and hence the fan blade wheels 12, 14, 16, 18, 20, to the direction of the oncoming wind. The vanes 32 may be made from any variety of rigid material, and may be shaped in any manner known to those skilled in the art, including the fin-shape depicted in FIGS. 1 and 14.

Figure 14:
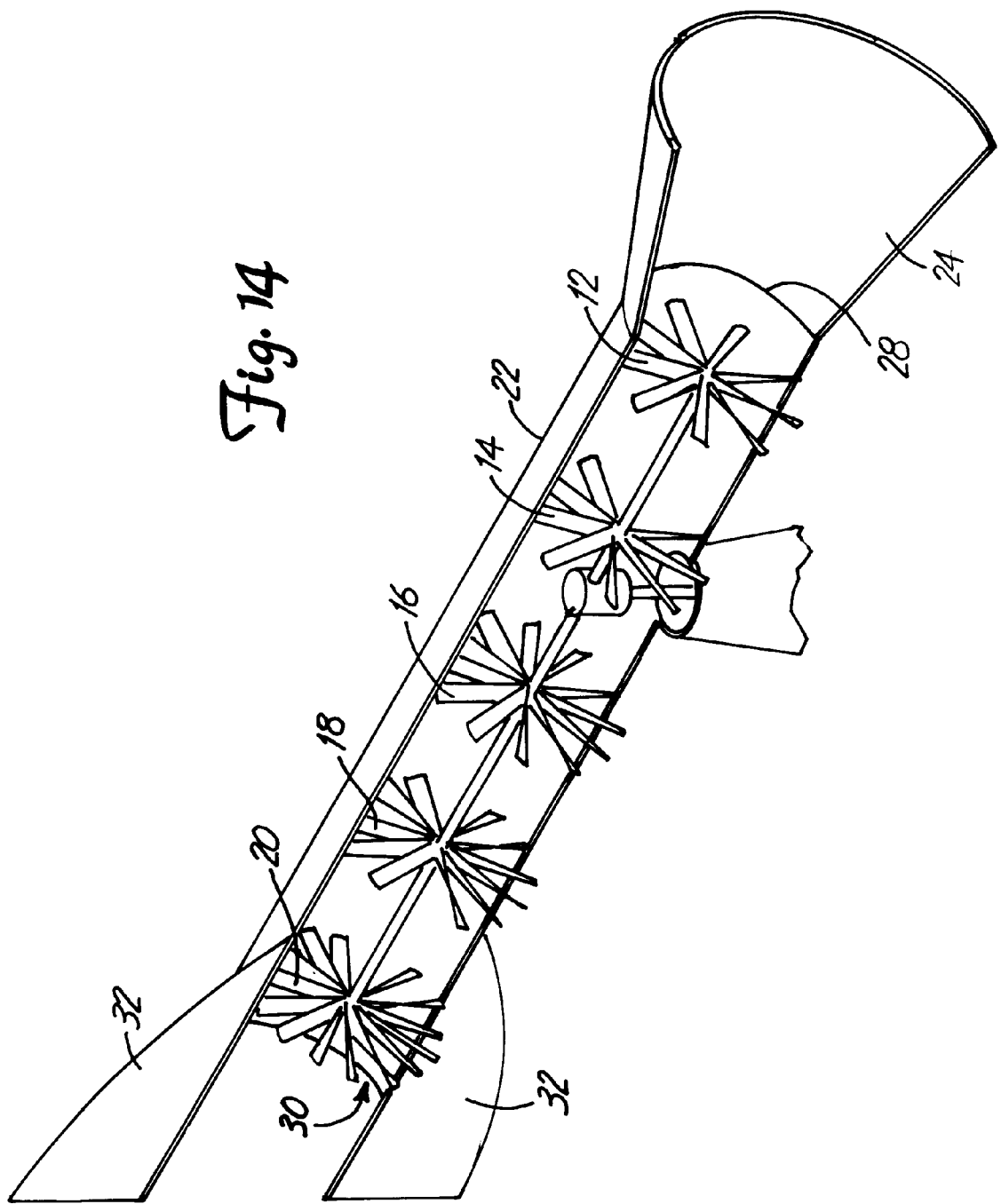
FIG. 14 is a perspective view of the embodiment of the invention shown in FIG. 1.

The series of fan blade wheels 12, 14, 16, 18, 20 are mounted to a shaft 26, which may be generally horizontal and coaxial with the longitudinal axis of the housing 22, for rotational movement in response to wind movements. Although the embodiment illustrated in FIGS. 1 and 14 shows a series of five fan blade wheels 12, 14, 16, 18, 20, any number of fan blade wheels may be used with the invention. In one embodiment, therefore, only one fan blade wheel may be connected to the shaft 26. In the embodiment of FIG. 1, when wind enters the inlet opening 28 of the housing 22, the fan blade wheels 12, 14, 16, 18, 20 are rotated by the force of the wind, rotating the shaft 26.

Throughout this specification, the term "fan blade wheel" will be used to refer to any variety of turbine devices known to those skilled in the art that may be used in windmills or wind turbines. Similarly, the term "blade" may refer to any turbine device used in windmills or wind turbines, or to one of many blades on a fan blade wheel. In one embodiment, therefore, the fan blade wheels may be of the variety shown in FIGS. 1, 2, and 3, consisting of blades 40, 42 extending from a central axis of rotation on the shaft 26. Any optimal number of blades 40, 42 may be used in the fan blade wheels, and the shape of the blades 40, 42 may be designed to optimize the efficiency of the fan blade wheels. Because a drop in pressure may occur over each fan blade wheel 12, 14, 16, 18, 20, the design of the blades 40, 42 of each successive fan blade wheel may vary from the previous fan blade wheel to optimize the efficiency of the wind turbine 10.

Figure 2:
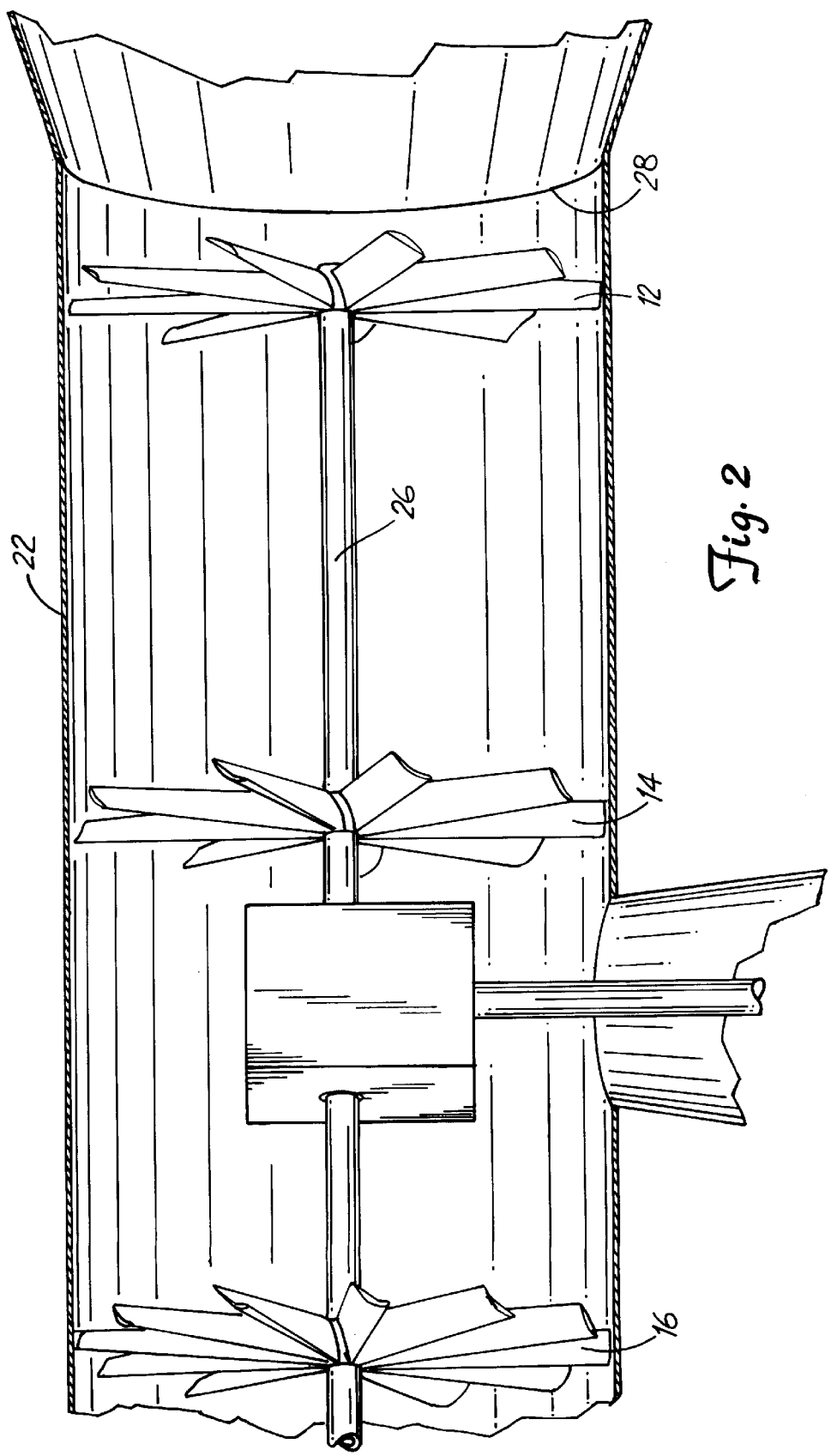
FIG. 2 is a side view of the center portion of the embodiment of FIG. 1.
Figure 3:
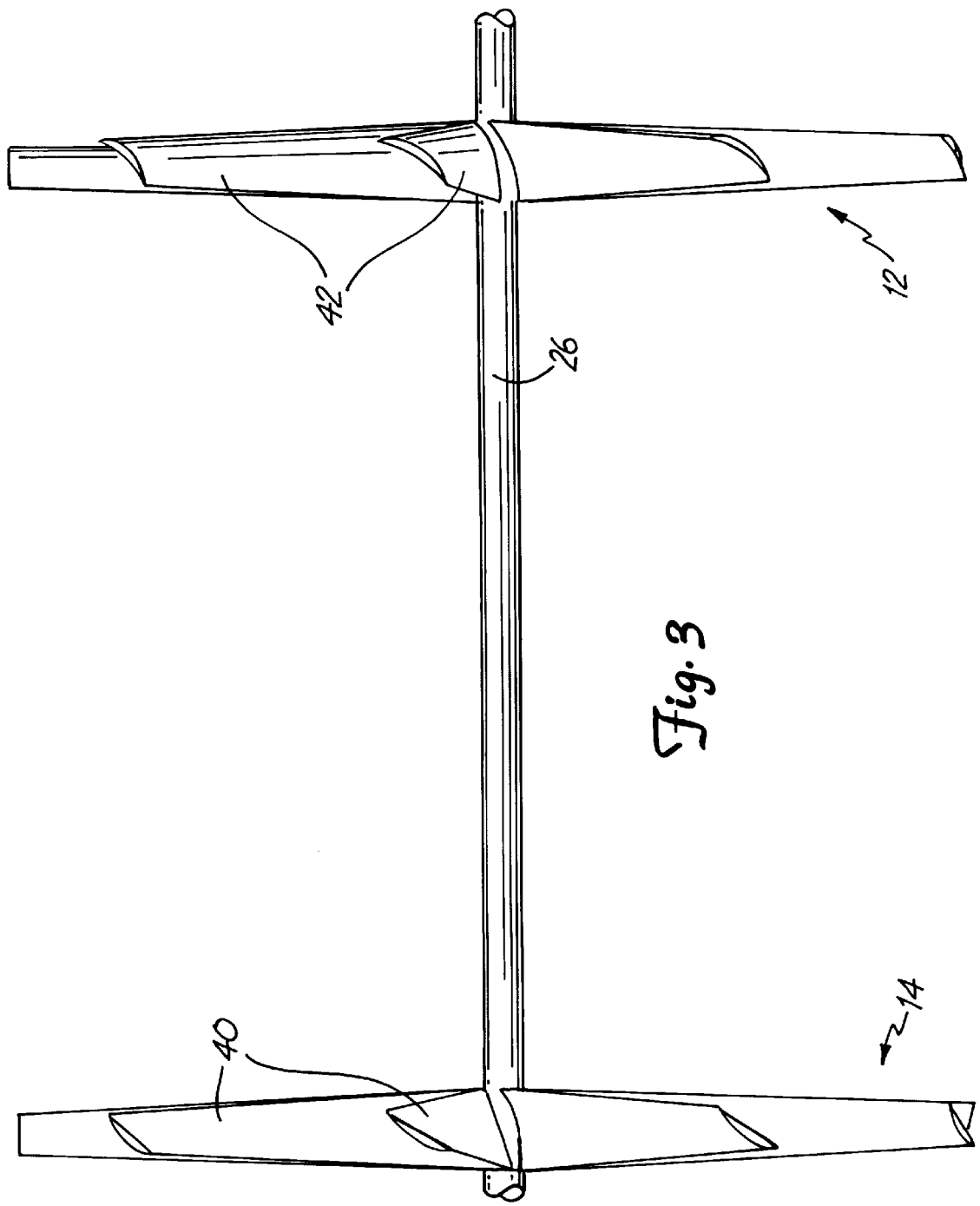
FIG. 3 is a side view of the fan blade wheels of the embodiment of FIG. 1.

In the embodiment shown in FIGS. 1, 2, and 3, the first fan blade wheel 12 nearest the inlet opening 28 of the housing 22 may be a compression fan blade wheel that acts to draw air into the housing 22 upon rotation of the shaft 26. In this embodiment, the remainder of the fan blade wheels 14, 16, 18, 20 may then be rotated by the airflow to rotate the shaft 26. FIGS. 2 and 3 illustrate the differing shape of the blades 40, 42 on fan blade wheels 14 and 12 respectively. In FIGS. 1, 2, and 3, air flows into the housing 22 from the right and moves toward the left. The visible blades 40 of fan blade wheel 14 in FIGS. 1, 2, and 3, therefore, rotate from the bottom of the figures toward the top as the wind pushes the blades 40. Upon rotation of the shaft 26, the blades 42 of fan blade wheel 12 act to draw air into the housing 22, i.e., from right to left in the figures.

The embodiment of the invention illustrated in FIG. 1 shows the use of a generally horizontal shaft 26 (coaxial with the longitudinal axis of the housing 22) driven by the force of the wind through the fan blade wheels 14, 16, 18, 20. This shaft 26 need not be horizontal when in use, but the wind turbine 10 functions efficiently when the shaft 26 is generally horizontal and hence the air can flow smoothly through the inlet opening 28 and down the length of the housing 22 without being redirected by the housing 22. Although a power generator (not shown in the figures) could be attached within the housing 22 and operated from the shaft 26, it is generally more desirable to operate the power generator at a location remote from the housing 22. For this reason, the shaft 26 may drive a generally vertical rod 50 that may run from the housing 22 to a remote location, perhaps at the base of a support structure upon which the wind turbine 10 may be mounted. The wind turbine 10 shown in FIG. 1, therefore, may be mounted on a support structure (not shown), which in turn may be mounted to either the ground or to a building. The vertical rod 50 is driven by the shaft 26 through a transmission device 52.

Figure 5:
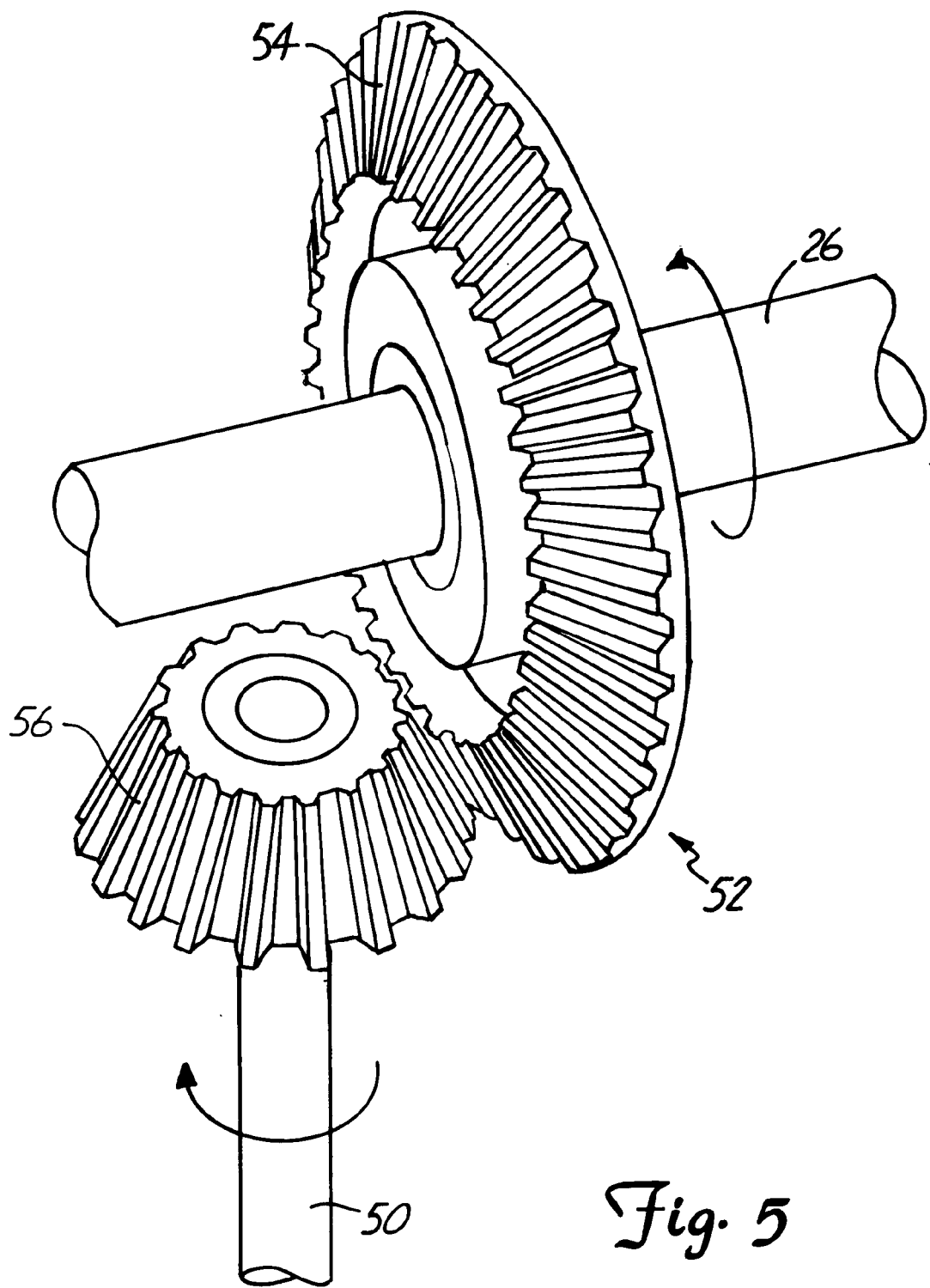
FIG. 5 is a side view of one embodiment of a transmission device for the embodiment of FIG. 1.
Figure 6:
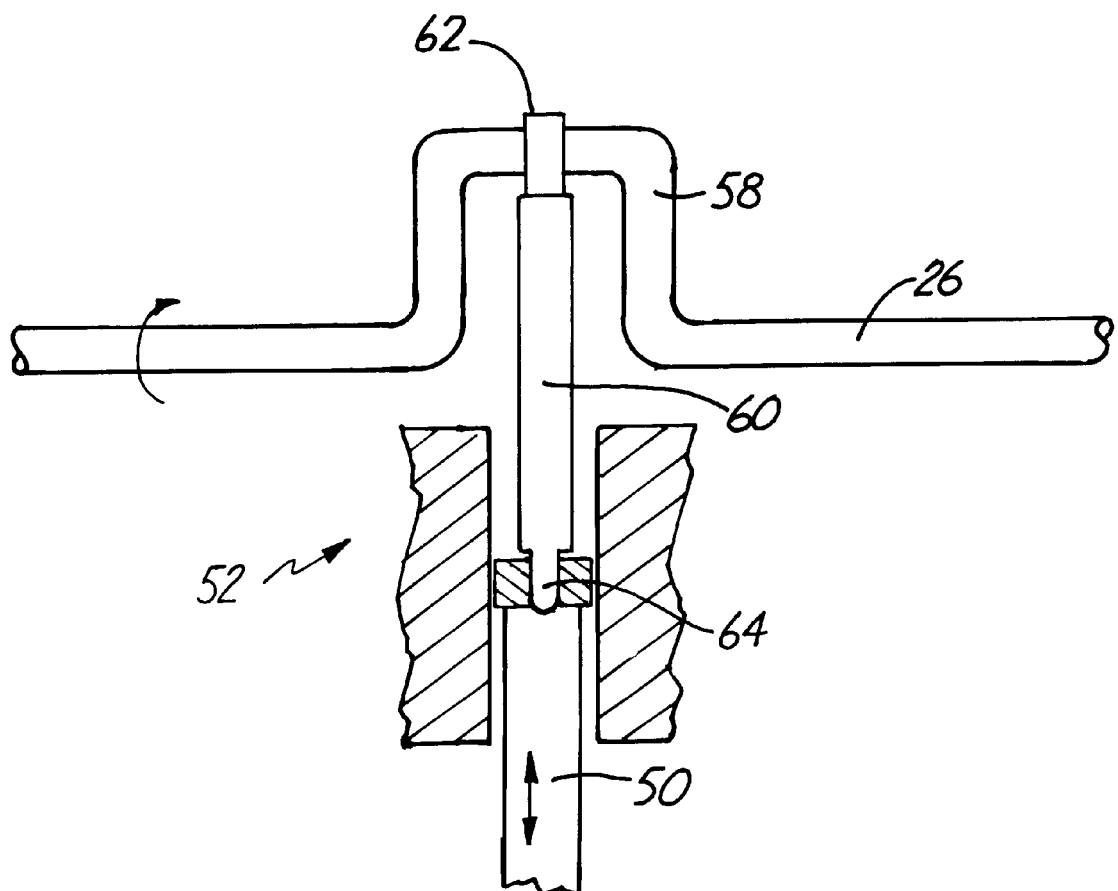
FIG. 6 is a side view of a second embodiment of a transmission device for the embodiment of FIG. 1.
Figure 7:
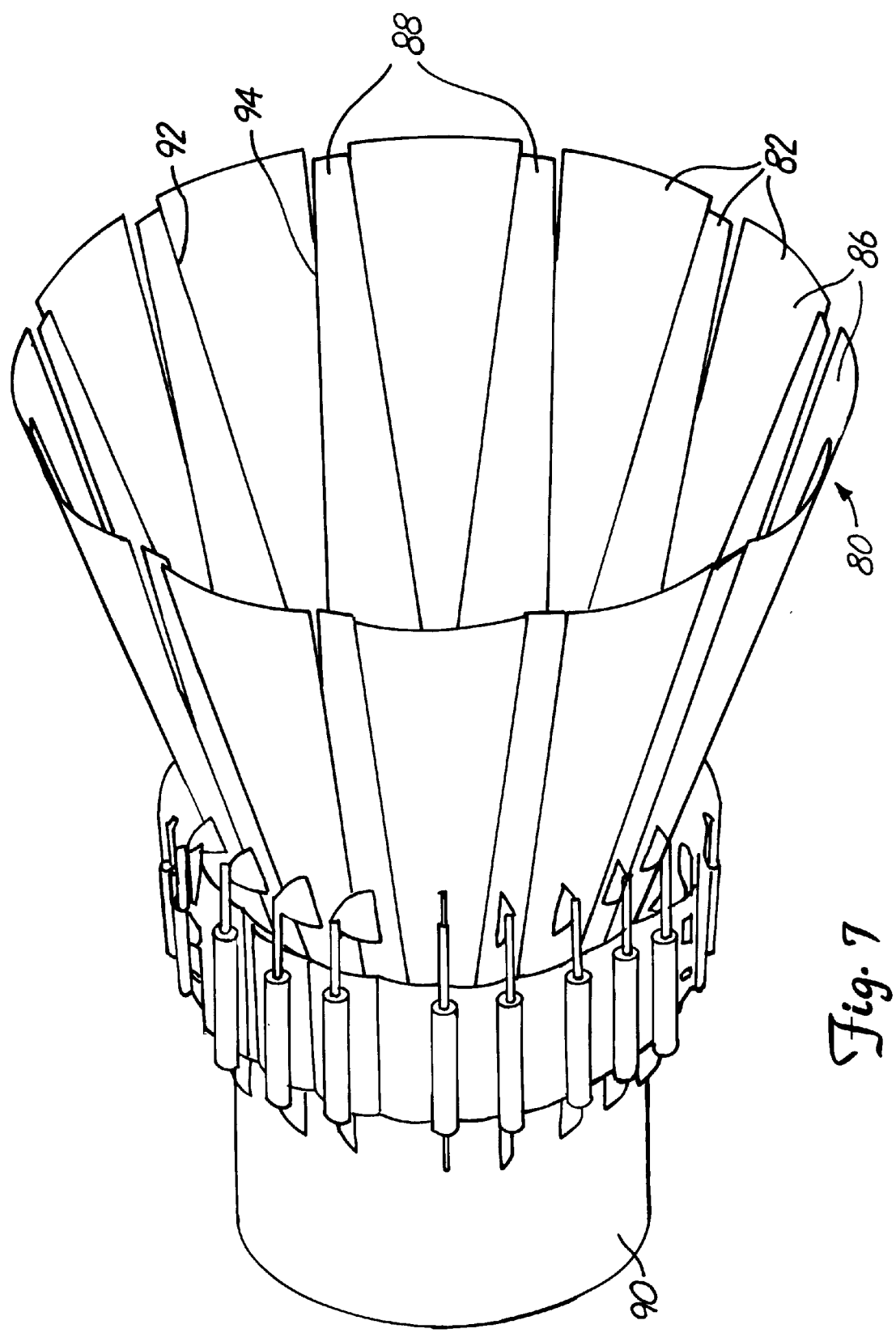
FIG. 7 is a perspective view of the scoop shown in the embodiment of FIG. 1.

FIGS. 5 and 6 show two potential transmission devices 52 that may be used in conjunction with the wind turbine 10, although any variety of other transmission devices 52 known to those skilled in the art may also be used. FIG. 5 shows a set of gears 54, 56 to be used as the transmission device 52, wherein the gears 54, 56 translate the rotational motion of the shaft 26 into rotational motion of the rod 50. The gears 54, 56 may be any variety known to those skilled in the art, and should not be considered limited by the specific gears 54, 56 illustrated in FIG. 5. Similarly, any other transmission device 52 known to those skilled in the art that may translate the rotational motion of the shaft 26 into rotational motion on the rod 50 may be used in conjunction with the wind turbine 10.

FIG. 6 shows a transmission device 52 that may be used to translate the rotational motion of the shaft 26 into reciprocal motion on the rod 50. The transmission device 52 of FIG. 6 consists of a U-bar portion 58 of the shaft 26 to which the top end 62 of a rocker 60 is attached. The bottom end 64 of the rocker 60 is attached to the rod 50. When the U-bar portion 58 of the shaft 26 is in the upper position, as illustrated in FIG. 6, the rod 50 is in its upper position. When the U-bar portion 58 of the shaft 26 is in its lower position, similarly, the rod 50 is in its lower position. The top end 62 of the rocker 60 may therefore move in a plane extending into and out of the figure as well as up and down, while the bottom end 64 of the rocker 60 only moves up and down as viewed in FIG. 6. Although FIG. 6 shows one device to translate the rotational motion of the shaft 26 into reciprocal motion of the rod 50, a variety of other devices, such as camming devices, may also be used to accomplish this task.

The scoop 24 of FIG. 1 increases or decreases the airflow into the inlet opening 28 of the housing 22. In one embodiment, the scoop 24 may simply be a circular tube or a cylinder of increasing diameter with distance from the inlet opening 28 of the housing 22. In another embodiment, the scoop 24 may be a circular tube or cylinder of decreasing diameter with distance from the inlet opening 28. The entrance to the scoop 24, therefore, may have either a smaller or larger surface area opening than the inlet opening 28 of the housing 22. In one embodiment, which may be particularly feasible for smaller turbine designs, fixed detachable scoops 24 of varying surface area openings may be screwed into the housing 22 near the inlet opening 28. In this embodiment, the scoops 24 of different shapes may be readily changed for varying wind conditions, and the scoops 24 may be in the form of either a cone or an inverse cone. Although the scoop 24 will generally be referred to throughout this specification as a separate piece from the housing 22, the scoop 24 may, in one embodiment, be merely an extension of the housing 22 itself. In this embodiment the housing 22 may simply expand or contract toward its inlet opening 28. The inlet opening 28 end of the housing 22 in this embodiment could be made from adjustable plastic or metal material that allows it to be adjusted.

In one embodiment the scoop 24 may be one single piece such that its surface area near the outer end 72 is fixed. In this embodiment, a cover (not shown in the figures) could be placed over the end of the scoop 24 so that air does not enter the scoop 24. The inner end 70 of the scoop 24 may be attached to the inlet opening 28 of the housing 22, and the outer end 72 of the scoop 24 may extend from the inner end 70 any desired distance. In one embodiment, the inner end 70 and outer end 72 of the scoop 24 may remain open so that air may freely pass through the scoop 24. In this embodiment, the surface area of the opening at the outer end 72 of the scoop 24 may be greater than the surface area of the opening at the inner end 70 of the scoop 24. When air flows into the scoop 24, therefore, the velocity of the air is greater near the inner end 70 of the scoop 24 than near the outer end 72 of the scoop 24. In another embodiment, the surface area of the opening at the outer end 72 of the scoop 24 may be adjustable for varying wind conditions and geographic locations of use of the wind turbine 10.

b. The Adjustable Scoop

An adjustable scoop 24 is illustrated in FIGS. 7–13. The adjustable scoop 24 in general comprises a set of flanges 80. Each flange 80 is connected to a circular band 90 at an inner end 84, and an outer end 82 of each flange 80 longitudinal extends from the circular band 90. Each flange 80 is adjustably connected to the circular band 90 so that the radial position of the outer end 82 of each flange 80 may be varied. In one embodiment, the inner end 84 of each flange 80 may be connected to the circular band 90 with a hinge, although any adjustable connecting device may be used for this connection.

Throughout this specification, the term "circular band" will be used to refer to the portion of the scoop 24 or housing 22 upon which the inner ends 84 of the flanges 80 may be connected. Although this circular band 90 will typically be referred to as part of the scoop 24, it may also be part of the housing 22 of the wind turbine 10. In one embodiment, therefore, the inner ends 84 of the flanges 80 may be connected directly to the housing 22 near the inlet opening 28 of the housing 22. It may be desirable, however, to have a separate band 90 as part of the scoop 24 so that the entire scoop 24 may be quickly and easily removed from the housing 22. In this embodiment, the circular band 90 would function as a support band for the flanges 80 and would attach directly to the housing 22 at the inlet opening 28.

The set of flanges 80 consists of inner flanges 88 and outer flanges 86. Although the geometry of the flanges 80 may vary, the flanges 80 may be either generally flat or slightly curved along the longitudinal axis, as shown in FIGS. 7–13. The flanges 80 may also be four-sided and trapezoidal in shape, with the edge of the inner end 84 parallel to the edge of the outer end 82 of each flange 80. The flanges 80 may also have two sides 92, 94, which, in one embodiment, are not parallel to each other. As shown in the embodiments of FIGS. 7, 8, 11, and 13, the set of inner flanges 88 and outer flanges 86 may mate to form a scoop 24 of increased surface area opening at the outer end 82 of the flanges 80.

Figure 9:
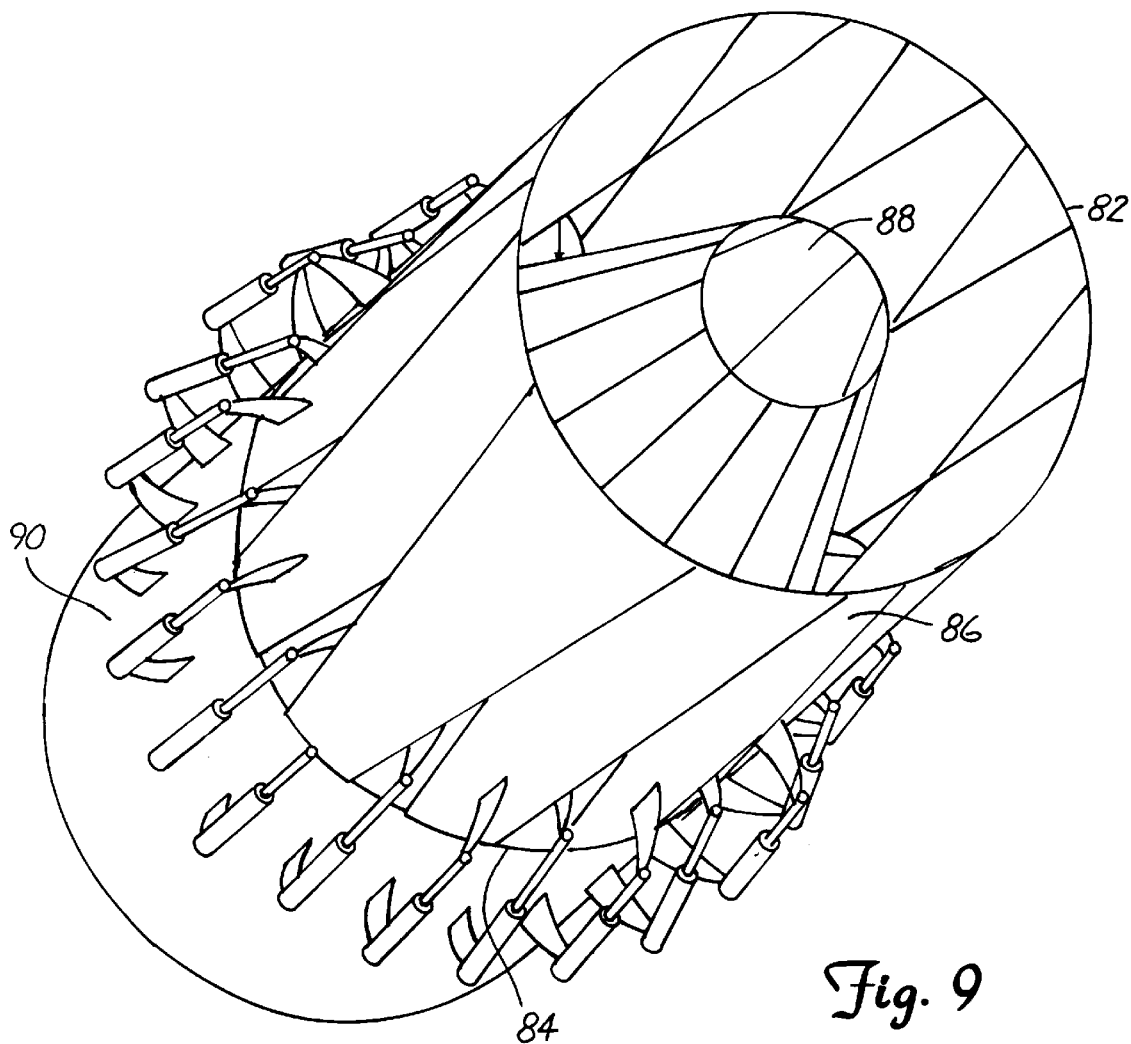
FIG. 9 is a perspective view of the scoop of FIG. 7 in operation.
Figure 10:
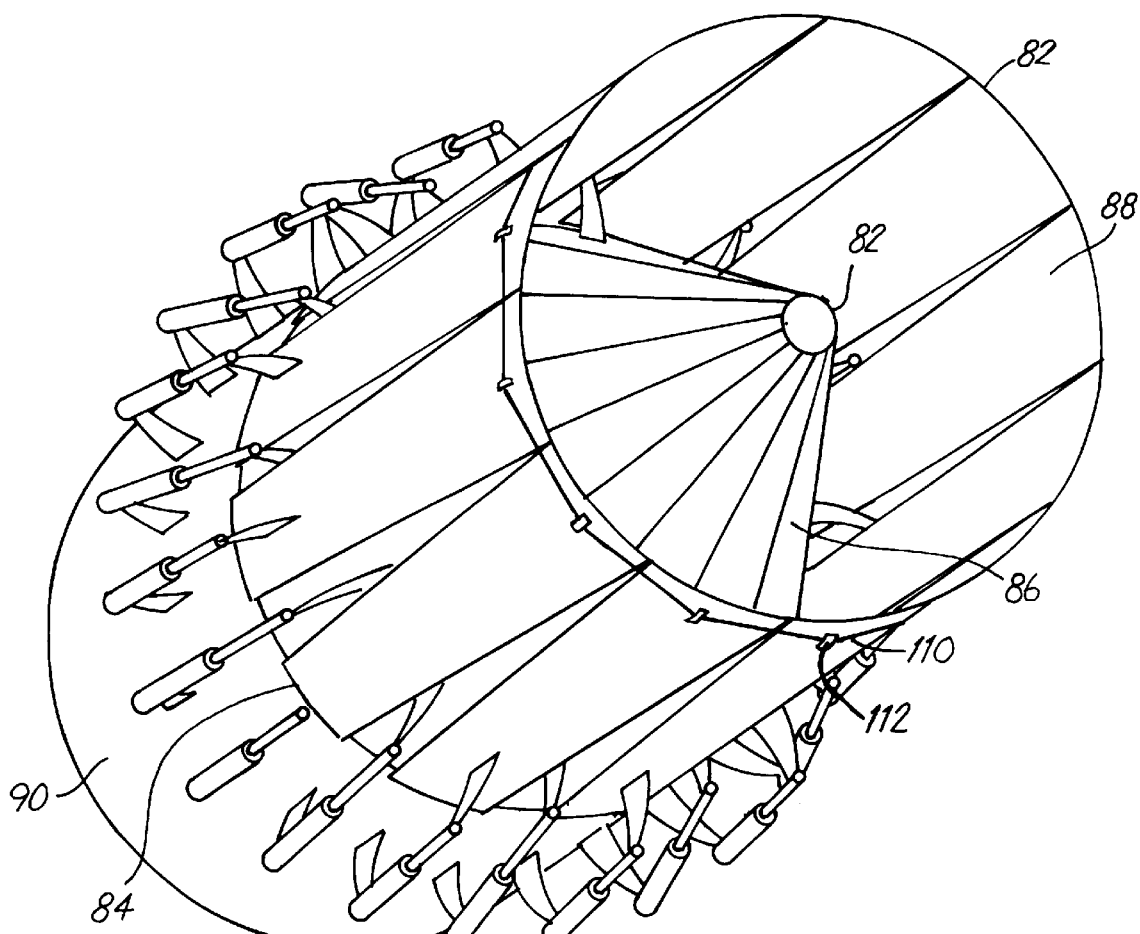
FIG. 10 is a second perspective view of the scoop of FIG. 7 in operation.
Figure 11:
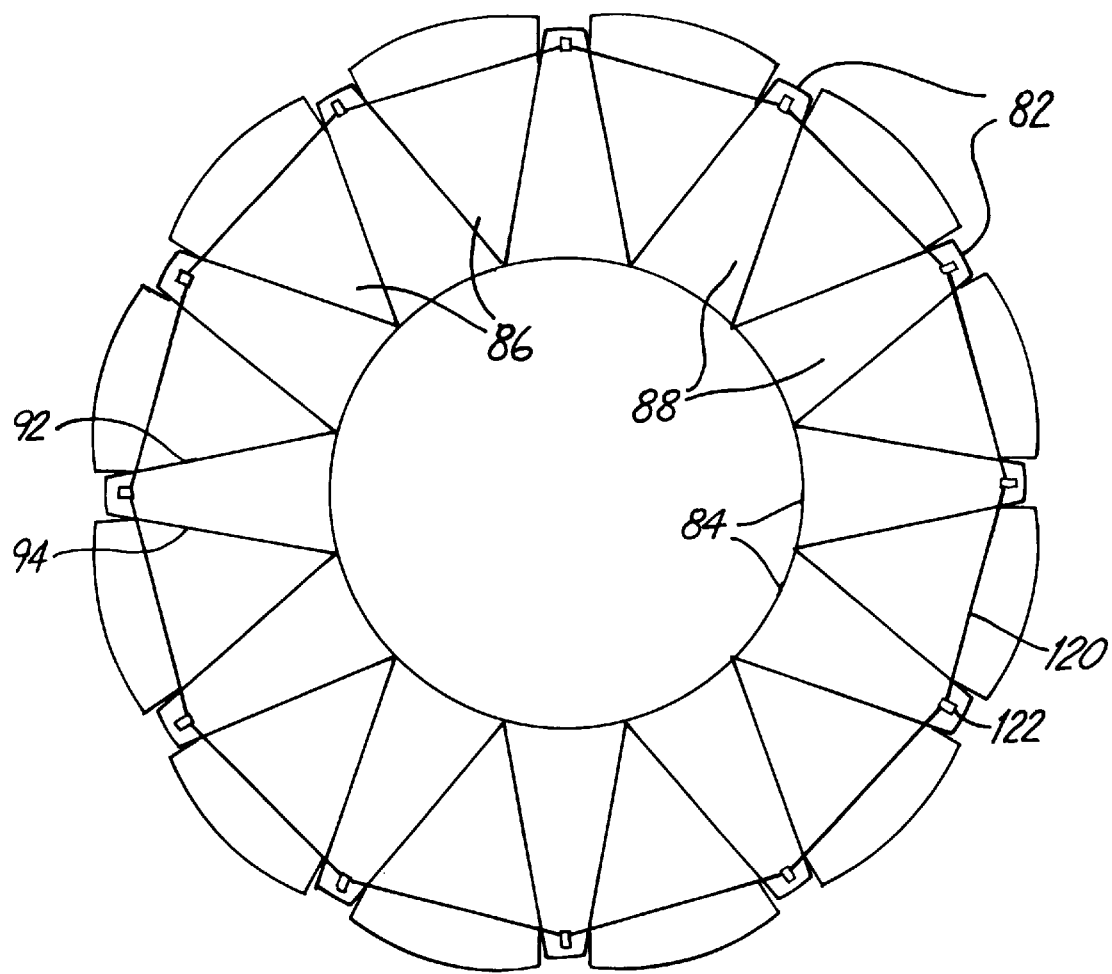
FIG. 11 is an end view of the scoop of FIG. 7.

FIG. 11 depicts the layout of the flanges 80 on the circular band 90 in one embodiment of the scoop 24. As can be seen in FIG. 11, the inner ends 84 of the inner flanges 88 form a continuous circle on the circular band 90, such that the inner end 84 of each inner flange 88 is directly adjacent to the inner flange 88 on either side. Each inner flange 88 may narrow in width (the distance between the two sides 92, 94) with distance from the inner end 84 toward the outer end 82. Although the shape of the inner flanges 88 may vary, they should be constructed such that when the outer ends 82 of the inner flanges 88 are brought together, as depicted in FIGS. 9 and 10, a cone is formed with a smaller surface area opening to the scoop 24 than the surface area opening at the circular band 90. In other words, the diameter of the inlet to the scoop 24 near the outer ends 82 is smaller when the inner flanges 88 are brought together than the diameter of the circular band 90. In one embodiment, the sides 92, 94 of the inner flanges 88 may smoothly mate with the sides 92, 94 of the adjacent inner flanges 88 when the inner flanges 88 are in the closed position. FIGS. 9 and 10 show two possible arrangements of the inner flanges 88 forming a cone when the inner flanges 88 are in the closed position.

As best illustrated in FIGS. 10 and 11, in one embodiment the outer flanges 86 are connected to the circular band 90 on the outer portion of the circular band 90. In other words, the outer flanges 86 are layered on top of the inner flanges 88 on the circular band 90. The geometry of the outer flanges 86 may vary. In one embodiment, the width of the outer flanges 86 decreases slightly with distance from the inner end 84. In one embodiment, there is a small distance between the inner ends 84 of the outer flanges 86 on the circular band 90, although the inner ends 84 of the outer flanges 86 may also border directly upon one another on the circular band 90 in another embodiment.

The outer flanges 86 and the inner flanges 88 form a scoop 24 when the flanges 80 are in the open position, as shown in FIGS. 7, 8, 11, and 13. When the flanges 80 are in the open position, the diameter of the opening to the scoop 24 near the outer ends 82 of the flanges 80 is larger than the diameter of the opening near the circular band 90. The outer ends 82 of the outer flanges 86 may, in one embodiment, mate to form a near-continuous circle. As FIGS. 7, 8, 11, and 13 illustrate, the outer flanges 86 may still be partially layered over the inner flanges 88 when the scoop 24 is in the open position, particularly near the inner ends 84 of the flanges 80.

As FIGS. 9 and 10 illustrate, when the inner flanges 88 are in the closed position to form a cone of decreased inlet diameter than the circular band 90, the outer flanges 86 may remain in the open position or may be partially closed. Because one feature of the closed position of the inner flanges 88 is to reduce the airflow to the fan blade wheels 12, 14, 16, 18, 20, it may be undesirable for the outer flanges 86 to capture large amounts of airflow when the inner flanges 88 are in the closed position. For this reason, in one embodiment there are spaces between the inner ends 84 of the outer flanges 86 along the circular band 90 so that air may flow between the outer flanges 86 and escape from the scoop 24 when the inner flanges 88 are in the closed position.

1. Hydraulic Actuators

Figure 8:
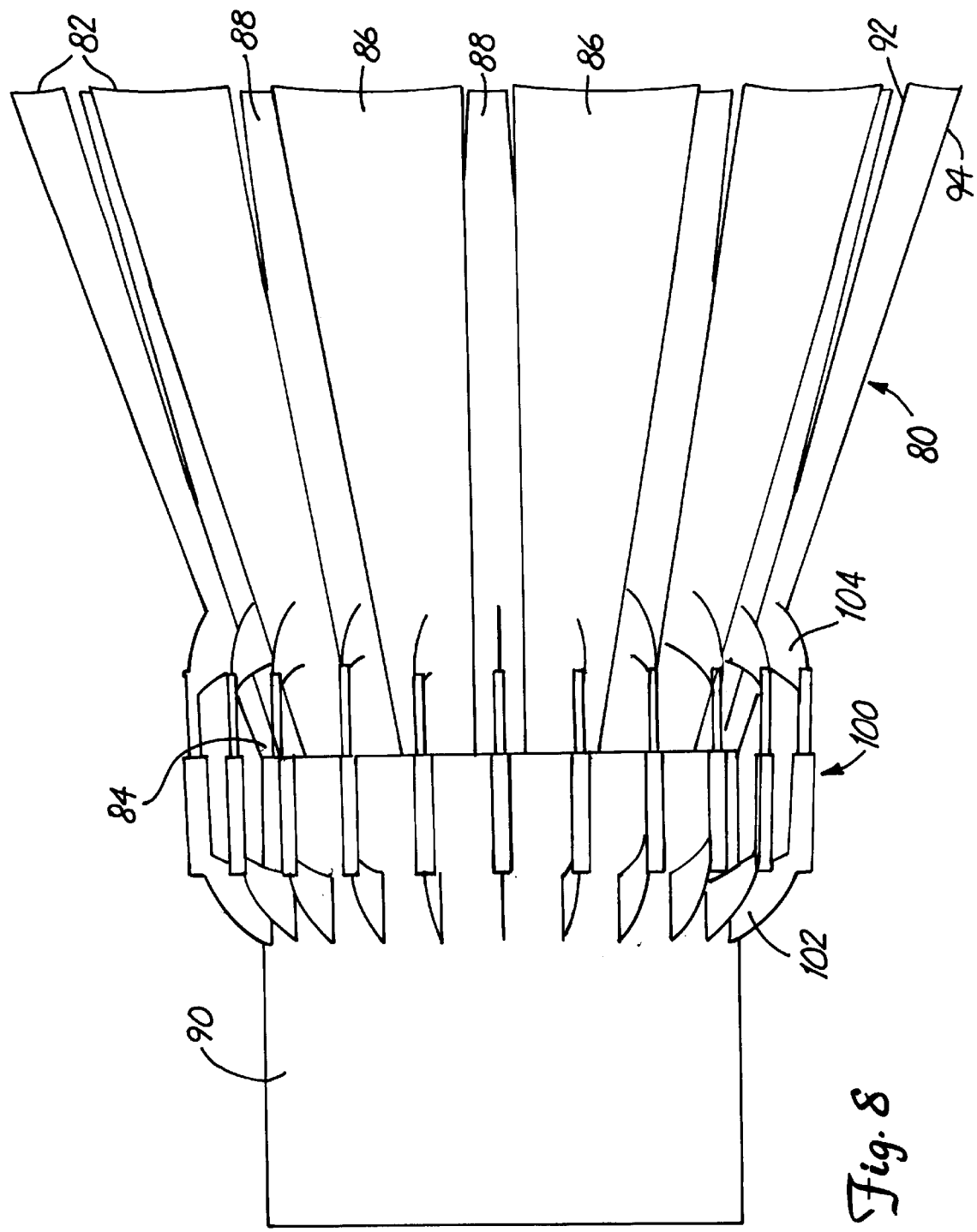
FIG. 8 is a side view of the scoop shown in FIG. 7.

The movement of the flanges may be accomplished by a variety of devices, two of which are depicted in FIGS. 7–11: actuators and manually adjustable wires. FIGS. 7–10 illustrate the use of actuators 100 to move the flanges 80 of the scoop 24 from the open to the closed positions and vice versa. As best illustrated in FIGS. 8 and 10, a first end 102 of each actuator 100 may be mounted to the circular band 90. If the scoop 24 does not contain a circular band 90, the first end 102 of each actuator 100 may be mounted to the housing 22 near the inlet opening 28. The second end 104 of each actuator 100 may then be mounted to a flange 80. The actuators 100 may then move the flanges 80 from the open to the closed position and vice versa. When an open position or closed position is reached, the actuators 100 may then serve as a lock to hold each flange 80 in position.

The actuators 100 may be any variety known to those skilled in the art. In one embodiment, hydraulic or pneumatic actuators may be used, while in other embodiments electrical actuators may be used.

2. Manual Adjusters

The movement of the flanges 80 may also be accomplished with manual adjusters. Although the use of hydraulic actuators 100 may be preferable for certain scoops 24, particularly large scoop designs, the use of actuators 100 may add substantial complexity as well as cost to the scoop 24. For this reason, manually adjustable wires provide a simplified method of adjusting the position of the flanges 80. FIGS. 10 and 11 best illustrate the use of the manually adjustable wires to alter the position of the flanges 80. Although actuators 100 are depicted in FIG. 10 along with manually adjustable wires, the actuators 100 are not necessary when the wires are used to alter the position of the flanges 80. Adjustment of the flanges 80 with the manual adjusters may be more desirable for smaller scoops 24 or may be desirable to reduce the cost of a scoop 24 or wind turbine.

FIG. 10 illustrates a wire 110 surrounding the outer flanges 86 near the outer ends 82. The wire 110 fits through a slot 112 in each outer flange 86 near the outer end 82. The wire 110 should be of sufficient length to fit around the outer flanges 86 when the outer flanges 86 are in the open position. To alter the position of the outer flanges 86, the wire 110 may simply be loosened or tightened. When the wire 110 is tightened, as seen in FIG. 10, the outer flanges 86 are in the closed position. When the wire 110 is loosened, the outer flanges 86 are in the open position. When the wire 110 is properly adjusted so that the outer flanges 86 are in the proper position, the outer flanges 86 may be locked in position with a variety of locking mechanisms, which are described below.

FIG. 11 illustrates a wire 120 surrounding the inner flanges 88 on the outer end 82 of each inner flange 88. The wire 120 fits within a slot 122 in each inner flange 88. Much like the wire 110 for the outer flanges 86, the wire 120 may be manually loosened or tightened to alter the position of the inner flanges 88. FIG. 11 depicts the wire 120 in the loosened position such that the flanges 80 are in the open position.

Figure 12:
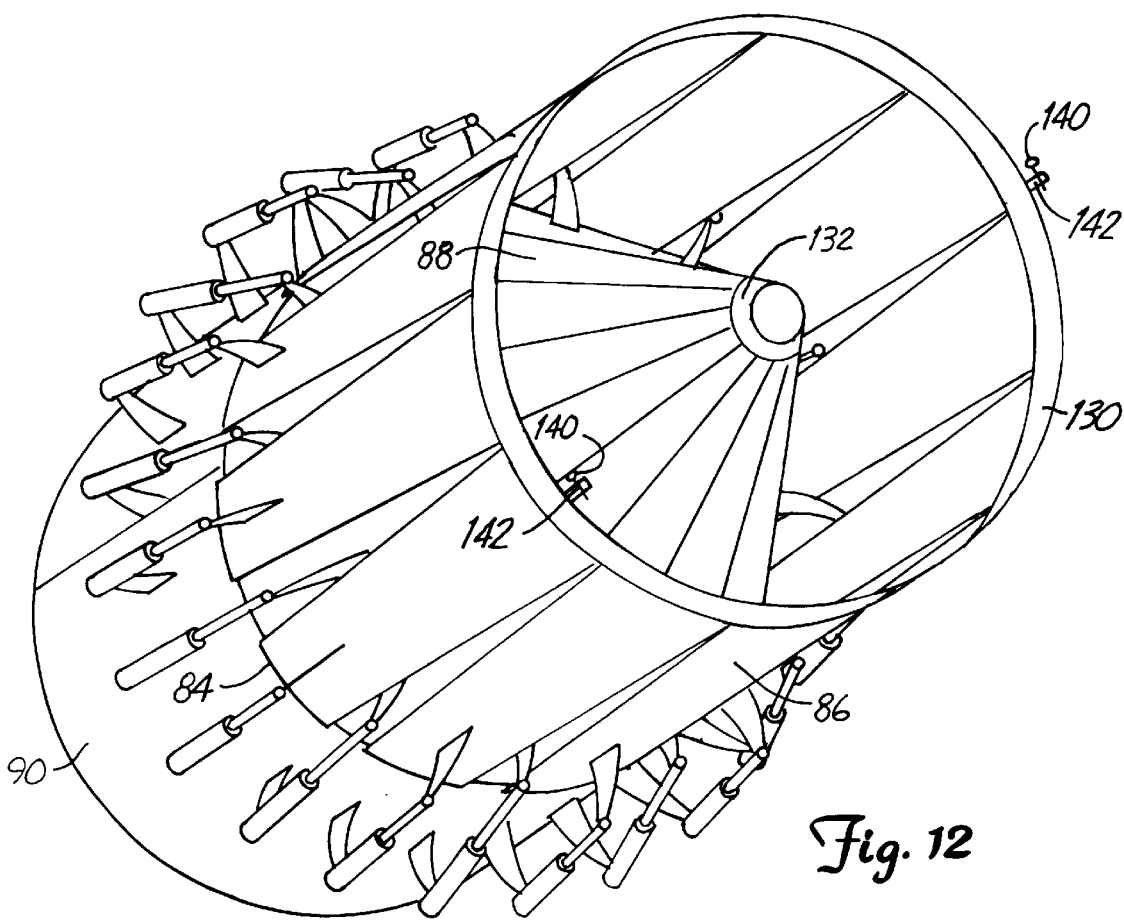
FIG. 12 is a perspective view of the scoop of FIG. 7 in the closed position with locks to keep the flanges in position.
Figure 13:
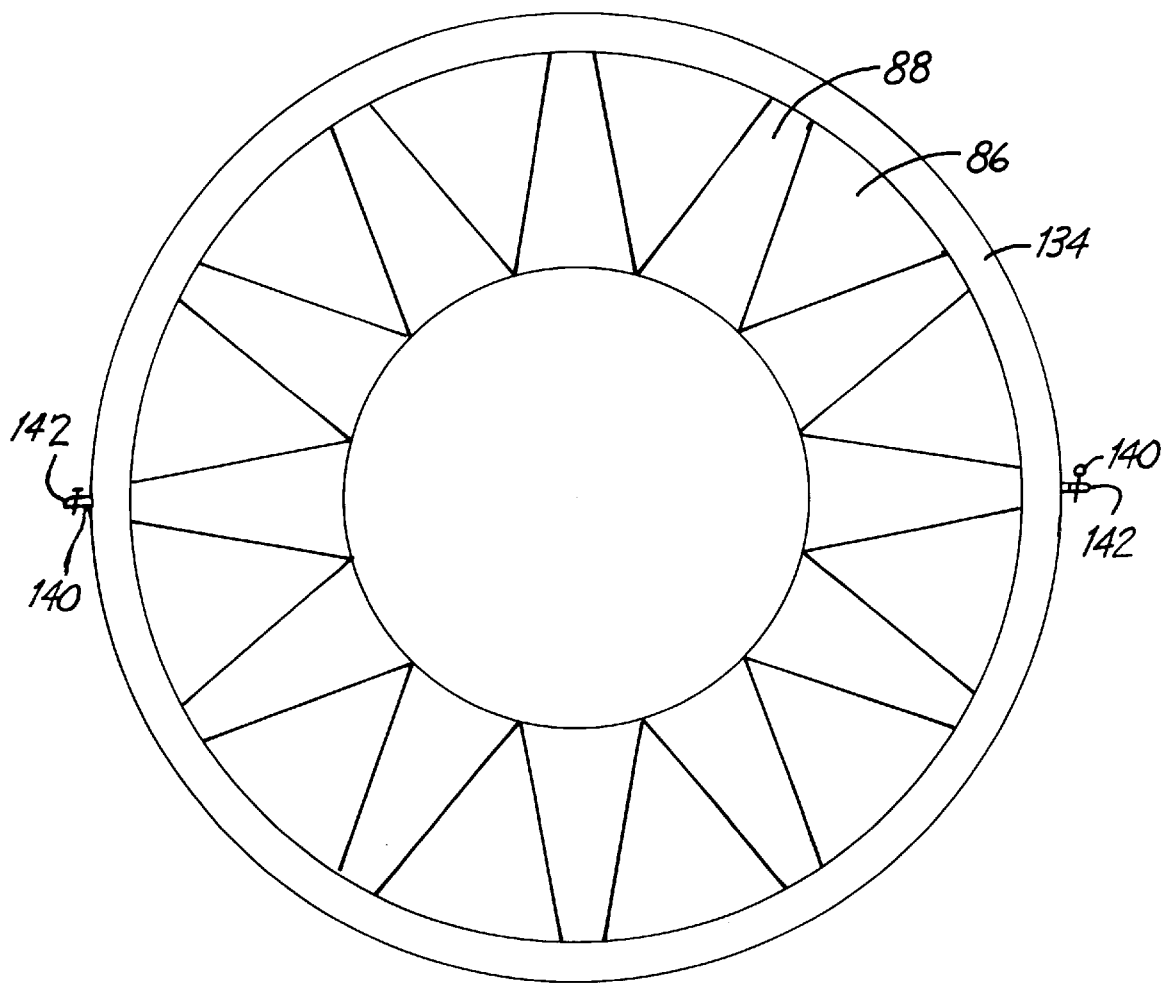
FIG. 13 is an end view of the scoop of FIG. 7 in the open position with a lock to keep the flanges in position.

When the wires 110, 120 are used to alter the position of the flanges 80, a device may be necessary to lock the flanges 80 in place. FIGS. 12 and 13 illustrate one embodiment that may be used to lock the flanges 80 in a fixed position. Although these locking mechanisms are described in conjunction with use of the wires 110, 120 to alter the position of the flanges 80, the locking mechanism may also be used to lock the flanges 80 when the actuators 100 are used to move the flanges 80.

FIGS. 12 and 13 show circular grooved rings that fit over the flanges 80 to lock the flanges 80 in place. In FIG. 12, for instance, the flanges 80 are in the closed position, and two rings 130, 132 lock the flanges 80 in place. Ring 130 fits over the outer flanges 86, and ring 132 fits over the inner flanges 88. Ring 132 may be slightly conical in shape, such that it can smoothly fit over the outer ends 82 of the inner flanges 88 when the inner flanges 88 are in the closed position. The rings 130, 132 may be made of any rigid material and should be generally circular in shape with a grooved slot into which the outer ends 82 of the flanges 80 fit. The rings 130, 132, therefore, may fit completely over the outer ends 82 of the flanges 80 and extend a short distance down the inner and outer surfaces of the flanges 80. FIG. 13 illustrates a similar ring 134 that fits over the flanges 80 when the scoop 24 is in the open position.

The rings 130, 132, 134 may be locked in position by any variety of devices known to those skilled in the art. In one embodiment, the rings 130, 132, 134 may be snap-fit rings that simply snap into place. In another embodiment, the rings 130, 132, 134 may be screwed and bolted to the flanges 80 to hold the rings in place. In the embodiment of FIG. 12, ring 130 is held in place by two keys 140 attached to outer flanges 86 near the outer end 82. The ring 130 contains two slots 142, each at opposite sides of the scoop 24 in FIG. 12, that fit over the keys 140 when the ring 130 is attached to the outer flanges 86. The keys 140 may then be rotated 90 degrees to hold the ring 130 to the outer flanges 86. The keys 140, therefore, are generally long and narrow, such that when they are rotated 90 degrees they do not fit through the slots 142 in the outer flanges 86. Similar devices may be used to lock rings 132, 134 to the flanges 80. The rings may be locked individually to each flange 80, or the rings may be locked to only one or two flanges 80 with the placement of the rings keeping the remainder of the flanges 80 in place.

c. Operation of the Invention

The scoop 24 of the invention described above may be attached to housing 22 or other suitable housings by any method. The scoop 24 may then be adjusted to be in the open position or closed position as desired by the atmospheric conditions. In extremely windy weather, for instance, the flanges 80 may be closed so that only a small surface area exits at the opening of the scoop 24. A correspondingly small volume of air will flow into the housing 22, and the wind turbine 10 may continue to generate power without being subjected to undue stress that may cause damage to the wind turbine 10. An advantage of the invention, therefore, is that it may be used in a variety of atmospheric conditions with only slight modifications. In one embodiment, the flanges 80 may be moved incrementally so that they may vary in a nearly infinite number of positions between the open and the closed positions.

The effectiveness of the scoop 24 in altering the velocity of the air entering the housing 22 may be calculated so that the flanges 80 may be designed for particular atmospheric ranges of wind velocities. The average velocity of the air, $V_2$, at the inner end 84 of the flanges 80 (and hence at the inlet opening 28 of the housing 22) may be approximated as follows:

$$V_2 = (A_1/A_2) * V_1,$$

where $V_1$ is the average velocity of the air and $A_1$ is the surface area of the opening at the outer end 82 of the flanges 80, and $A_2$ is the surface area of the opening at the inner end 84 of the flanges 80. Thus, the ratio $A_1/A_2$ determines the ratio of the velocities $V_2/V_1$.

Figure 4:
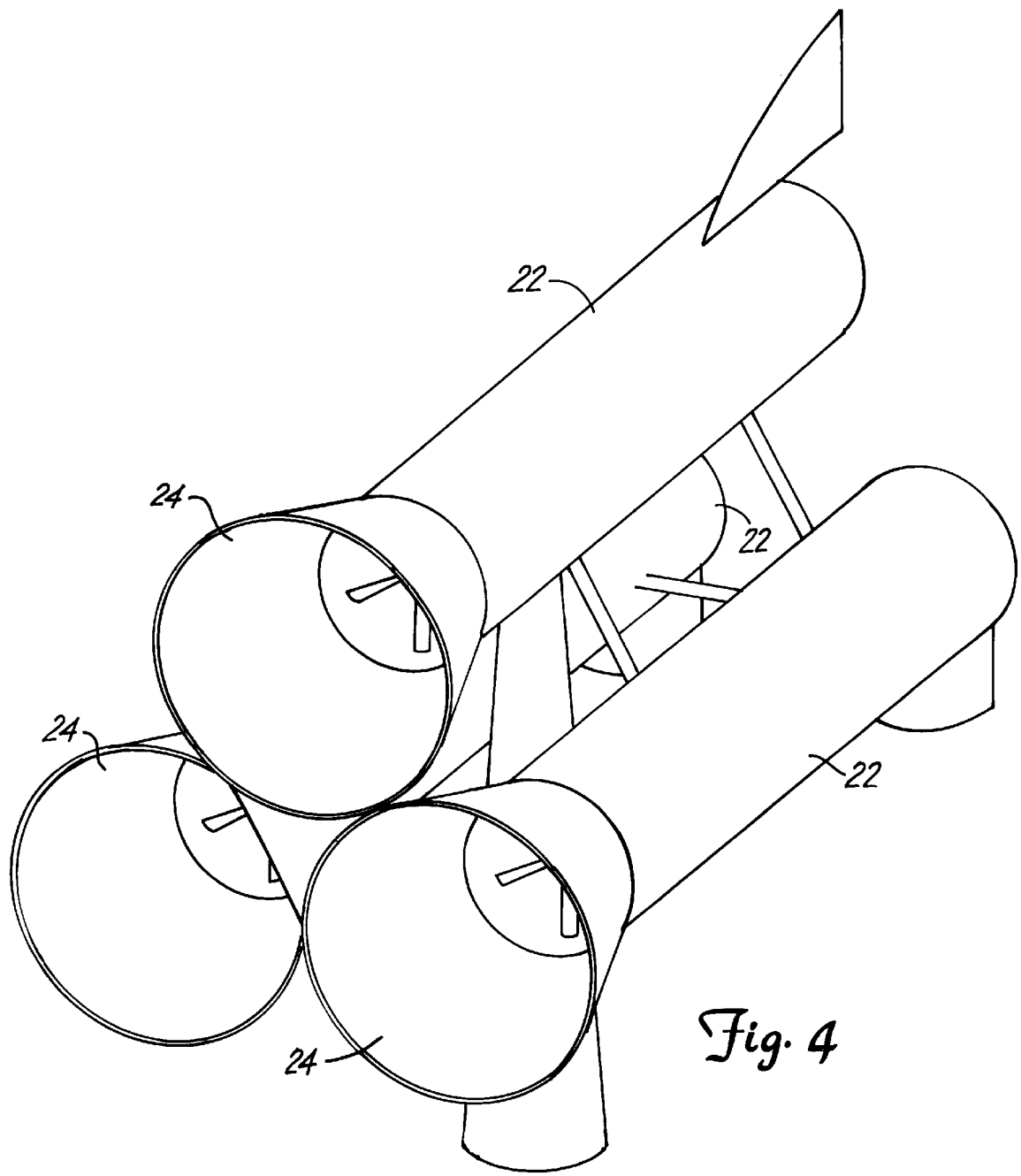
FIG. 4 is a perspective view of an alternative embodiment of the wind turbine.

The wind turbine 10 and the scoop 24 of the invention may be designed in varying sizes depending on the intended atmospheric conditions of use. For larger wind turbine designs, actuators, for example actuators 100, may be desirable to move the flanges 80 of the scoop 24. For smaller designs, the manual adjusters with rings to lock the flanges 80 in place may be more desirable to reduce cost and complexity. For such units, manual adjustment of the flanges 80 and placement of the rings should be a relatively simple task. The wind turbine 10 may be affixed to different structures and may be combined with different or similar designs to produce different wind turbine designs. FIG. 4 illustrates one alternative embodiment of the wind turbine 10 in which multiple housings 22 and scoops 24 (3 sets of each are depicted) are fixed together in one unit to harness wind energy.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims.

What is claimed is:

1. A wind turbine for generating power comprising:

(a) one or more blades mounted to a shaft for rotational movement in response to an airflow;

(b) a housing having a generally central longitudinal axis, the housing surrounding the one or more blades and the shaft, wherein the housing includes an inlet opening and an outlet opening;

(c) an adjustable scoop operably associated with the housing to alter the airflow entering the inlet opening, wherein the adjustable scoop comprises a plurality of flanges, and wherein a first end of each flange is movably connected to a generally circular band and each flange extends longitudinally from the generally circular band to an outer end, wherein the plurality of flanges consists of inner flanges and outer flanges; and (d) an actuating device to rotate each flange relative to the generally circular band, such that the radial position of the outer end of each flange is adjustable, wherein the inner flanges may be adjusted to form a cone with a smaller inlet diameter than that of the generally circular band, and wherein the inner flanges and outer flanges may be adjusted to mate and form a scoop with a larger inlet diameter than that of the generally circular band.

2. A wind turbine for generating power comprising:

(a) one or more blades mounted to a shaft for rotational movement in response to an airflow;

(b) a housing having a generally central longitudinal axis, the housing surrounding the one or more blades and the shaft, wherein the housing includes an inlet opening and an outlet opening;

(c) an adjustable scoop operably associated with the housing to alter the airflow entering the inlet opening, wherein the adjustable scoop comprises a plurality of flanges, and wherein a first end of each flange is movably connected to a generally circular band and each flange extends longitudinally from the generally circular band to an outer end, wherein the plurality of flanges consists of inner flanges and outer flanges; and (d) wherein the inner flanges of the scoop decrease in width with distance from the circular band, such that when the outer ends of the inner flanges are adjusted to form a cone, each inner flange mates along its edges with the adjacent inner flanges, and wherein the first end of each inner flange borders on the first ends of the adjacent inner flanges on the generally circular band.

3. A scoop attachable to a wind turbine enclosed by a housing, the scoop comprising:

(a) a plurality of flanges, wherein a first end of each flange is movably connected to a circular band having a generally longitudinal axis and each flange extends from the circular band to an outer end, wherein the plurality of flanges consists of inner flanges and outer flanges;

(b) an actuating device to move each flange relative to the circular band, such that the radial position of the outer end of each flange relative to the longitudinal axis is adjustable, wherein the inner flanges may be adjusted to form a cone with a smaller inlet diameter than that of the circular band, and wherein the inner flanges and outer flanges may be adjusted to mate and form a scoop with a larger inlet diameter than that of the circular band.

4. The scoop of claim 3 wherein the inner flanges are generally flat and trapezoidal in shape with side edges, and wherein the inner flanges decrease in width with distance from the circular band, such that when the outer ends of the inner flanges are adjusted to form a cone, each inner flange smoothly mates along its side edges with the adjacent inner flanges.

5. The scoop of claim 3 wherein the first end of each inner flange borders on the first ends of the adjacent inner flanges on the circular band.

6. The scoop of claim 3 wherein the actuating device is a plurality of hydraulic actuators connected at a first end to the circular band and at a second end to the flanges.

7. The scoop of claim 3 wherein the actuating device is a first wire attached to the outer edge of each inner flange and a second wire attached to the outer edge of each outer flange, the wires being adjustable to draw the outer edges of the flanges together or apart.

8. The scoop of claim 7 further comprising a generally rigid ring removably attachable to the outer end of the flanges to maintain the position of the flanges.

9. The scoop of claim 7 further comprising a generally rigid ring removably attachable to the outer end of the inner flanges to maintain the position of the inner flanges when adjusted to form a cone.

10. A scoop attachable to a wind turbine enclosed by a housing to regulate the airflow into the housing, the scoop comprising:

(a) a set of inner flanges connected at a first end to a support band and extending to an outer end, wherein the outer ends of the inner flanges may be joined together to form a smaller surface area opening to the scoop than a surface area opening at the support band; and (b) a set of outer flanges connected at a first end to the support band and extending to an outer end, wherein the outer ends of the outer flanges and the outer ends of the inner flanges may be aligned together to form a larger surface area opening to the scoop than the surface area opening at the support band.

11. The scoop of claim 10 further comprising a set of actuators connected to the inner flanges and outer flanges to adjust the radial position of the outer ends of the flanges relative to a longitudinal axis of the support band.

12. The scoop of claim 10 further comprising a first manually adjustable wire connecting the outer ends of each inner flange and a second manually adjustable wire connecting the outer ends of the outer flanges, wherein adjustment of the wires alters the radial position of the flanges relative to a longitudinal axis of the support band.

* * * * *